INVENTORS
MAYNARD C. PAUL
PAUL E. OBERG
GERALD F. SAUTER

BY Kenneth T. Grace
ATTORNEY

United States Patent Office 3,546,579
Patented Dec. 8, 1970

3,546,579
THIN-FERROMAGNETIC-FILM MAGNETORESISTANCE MAGNETOMETER SENSITIVE TO EASY AXIS FIELD COMPONENTS AND BIASED TO BE INSENSITIVE TO HARD AXIS FIELD COMPONENTS
Maynard C. Paul, Gerald F. Sauter, and Paul E. Oberg, Minneapolis, Minn., assignors to Sperry Rand Corporation, New York, N.Y., a corporation of Delaware
Filed Oct. 22, 1968, Ser. No. 769,489
Int. Cl. G01r 33/02
U.S. Cl. 324—46            10 Claims

ABSTRACT OF THE DISCLOSURE

A magnetometer that utilizes four anisotropic thin-ferromagnetic-films arranged in a Wheatstone bridge configuration. The films' magnetoresistive properties are utilized to provide a resistance change in the bridge arms when subjected to a to-be-measured magnetic field. The four films are arranged with their easy axes aligned orthogonal to a constant hard axis bias field. Films in balancing legs are subjected to bias fields of opposite polarities whereby the bridge network is rendered substantially insensitive to ambient or other hard axis field components.

BACKGROUND OF THE INVENTION

The present invention relates to a magnetometer for measuring ambient field intensity changes. The magnetometer of the present invention utilizes four anisotropic thin-ferromagnetic-films that are arranged in a Wheatstone bridge configuration with the films' magnetoresistive properties providing a corresponding resistance change in the bridge arms when subjected to a magnetic field. The magnetoresistive characteristics of a thin-ferromagnetic-film are well-known and have been utilized to provide many types of devices; as an example, a digital-to-analog converter in the C. H. Tolman Pat. No. 3,372,387, and an amplifier in the P. E. Oberg et al. Pat. No. 3,382,448.

In the publication "Thin Flm Magnetoresistance Magnetometer" R. S. Hebbert, et al., The Review of Scientific Instruments, vol. 37, No. 10, October 1966, pages 1321–1323 there is disclosed a magnetometer that utilizes an etched thin-ferromagnetic-film layer that is arranged in a Wheatstone bridge configuration wherein the film layer's magnetoresistive properties are utilized to provide a resistance change in the bridge arms when subjected to an AC magnetic field. The AC magnetic field produces an unbalance in the bridge arms, which unbalance is a function of the intensity of the AC magnetic field, providing a corresponding output signal amplitude. The film layer is arranged with its easy axis aligned orthogonal to a constant hard axis bias field, i.e., a magnetic field that is applied parallel to the plane of the film layer and transverse to its easy axis, of an intensity or amplitude that is much greater than the anisotropy field $H_k$ of the film layer. This arrangement, due to the fast domain switching characteristics of the film layer has an inherently fast response time having a stated flat response to AC magnetic fields of frequencies in the order of 65 mHz. However, with a constant bias fiield oriented orthogonal with respect to the film layer's easy axis and with the same relative polarity, ambient fields, or other extraneous hard axis field components, are additive providing inherent unbalance errors in the bridge network. The present invention is directed toward a novel apparatus and method that may be considered to be an improvement type invention to that of the apparatus and method disclosed in the above referenced publication.

SUMMARY OF THE INVENTION

The magnetometer of the present invention utilizes four anisotropic thin-ferromagnetic-films that are arranged in a Wheatstone bridge configuration. The four films are arranged with their easy axes aligned and orthogonal to a constant hard axis bias field which is substantially greater than the anisotropy field $H_k$ of the films. The pairs of films in the balancing legs of the Wheatstone bridge are subjected to bias fields of opposite polarities whereby the bridge network substantially self-cancels ambient field, i.e., constant hard axis field, components thereby permitting a more accurate measurement of the to-be-measured magnetic field to which the four films of the Wheatstone bridge are subjected. This self-cancelling feature permits the more sensitive detection of to-be-measured magnetic fields of substantially less intensity than that permitted by prior art devices.

DESCRIPTION OF THE PREFERRED EMBODIMENT

Figure 1:
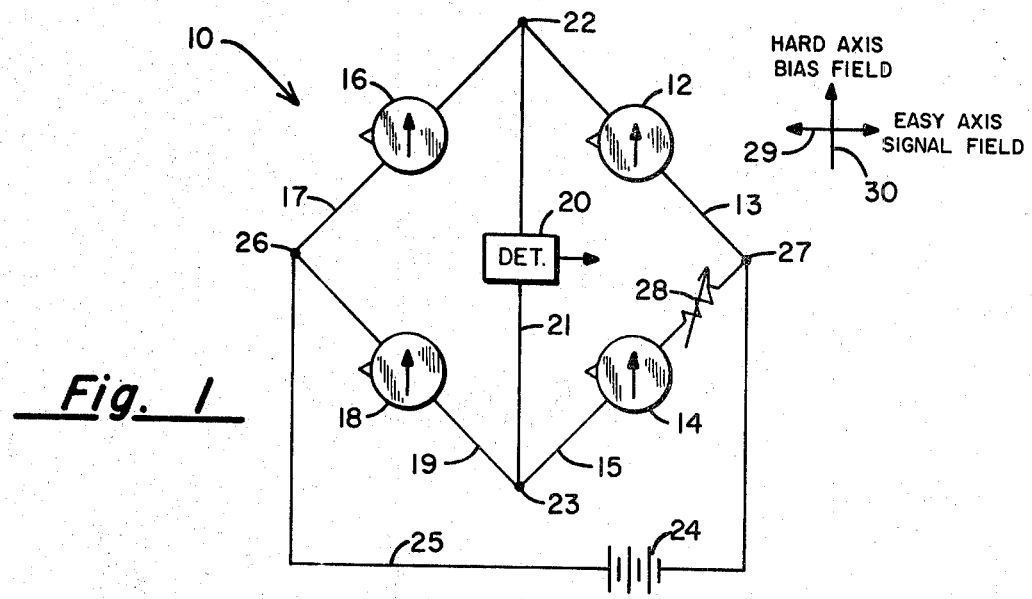
FIG. 1 is an illustration of a magnetometer system utilizing four magnetoresistive elements arranged in a Wheatstone bridge configuration.

FIG. 1 is an illustration of a manetometer system utilizing four magnetoresistive elements arranged in a Wheatstone bridge configuration. Magnetometer system 10 utilizes four anisotropic thin-ferromagnetic-film elements 12, 14, 16, 18 that are arranged in a Wheatstone bridge configuration by associated current conducting means 13, 15, 17, 19. A detector 20 is coupled across a first pair of nodes 22, 23 by its associated current conducting means 21 while voltage source 24 is coupled across a second pair of nodes 26, 27 by its associated current conducting means 25. As is well-known in Wheatstone bridge configuration operation, the four branches or arms of the bridge configuration formed by elements 12, 14, 16, 18 and their associated current conducting means 13, 15, 17, 19 are chosen with respectively associated resistances such that under a nominal condition the voltage difference between nodes 22, 23 is insubstantial indicating a balanced bridge condition. A trimming or balancing resistor 28 may be utilized to compensate for slight resistance variations whereby under nominal conditions detector 20 detects no unbalance in the Wheatstone bridge configuration. The four elements 12, 14, 16, 18 preferably have single-domain properties and the characteristic of uniaxial anisotropy with an anisotropic field $H_k$ providing in the planes of said elements a hard axis 30 and an orthogonal easy axis 29 of magnetization along which the remanent magnetization thereof may lie in a first or a second and opposite direction. Each of the elements 12, 14, 16, 18 is coupled by its associated current conducting means 13, 15, 17, 19 for causing current to pass therethrough at approximately a 45° angle with respect to its easy axis 29, which 45° angle provides optimum operation of the element and its associated current conductor means as a magnetoresistive amplifier—see P. E. Oberg et al. Pat. No. 3,382,448.

As is well-known in Wheatstone bridge operation, with the resistances in the four arms (formed by 12, 13 and 14, 15 and 16, 17 and 18, 19) of the bridge balanced, the current caused to flow therethrough (by 24, 25 from node 26 to node 27) is equal, whereby the voltage difference across the midpoints (nodes 22, 23) of the balanced pairs of arms (pair of arms 12, 13 and 16, 17 and pair of arms 14, 15 and 18, 19) is insubstantial. This balanced condition is detected (by detector 20) across the midpoints (across nodes 22, 23 by current conductor means 21). In contrast, an unbalance in the resistances of the four arms of the bridge produces an unbalanced condition whereby a substantial voltage difference is caused to exist across the midpoints of the pairs of arms. This unbalance is detected as a quantitative measure of bridge unbalance.

Figure 2A:
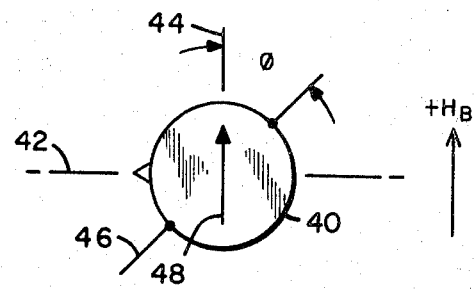
FIGS. 2a–2f are diagrammatic illustrations of the effects of the hard axis bias field $H_B$ and the easy axis signal field $H_S$ upon the magnetization of the magnetoresistive elements of FIG. 1.

With particular reference to FIGS. 2a–2f there are presented diagrammatic illustrations of the effects of the hard axis bias field $H_B$ and the easy axis signal field $H_S$ upon the magnetization of the magnetoresistive elements of FIG. 1. With particular reference to FIG. 2a there is presented a diagrammatic illustration of the effect of the hard axis bias field $+H_B$ upon the magnetization of a magnetoresistive element 40. Element 40 is similar to elements 12, 14, 16, 18 of FIG. 1, being a magnetoresistive thin-ferromagentic-film having single-domain properties and the characteristic of uniaxial anisotropy with an anisotropic field $H_k$ while providing in the plane of element 40 a hard axis 44 and an orthogonal easy axis 42 of magnetization along which the remanent magnetization thereof may lie in a first or a second and opposite direction. As with FIG. 1, element 40 has an associated current conducting means 46 coupled thereto for causing currents to pass therethrough at approximately a 45° angle with respect to its easy axis 42. The angle $\phi$ is noted as the angle formed by hard axis 44 and current conducting means 46. With a transverse or hard axis bias field $+H_B$ inductively coupled to element 40 having an intensity in the area of element 40 that is at least as great as the anisotropy field $H_k$ of element 40, the magnetization 48, as is well-known, is caused to be aligned along the hard axis 44 at an angle $\phi$ with current conductor means 46. This may be considered to be a nominal condition for a hard axis bias field $+H_B$.

Figure 2B:
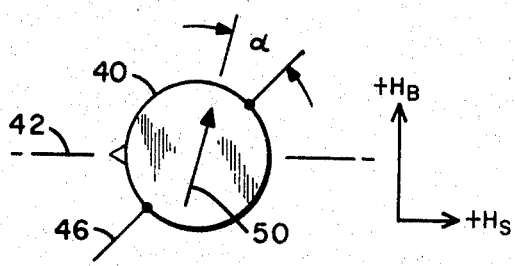
Figure 2C:
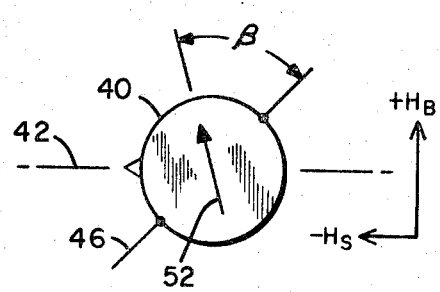
Figure 2D:
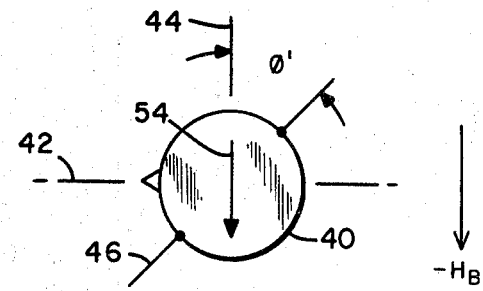

If now, from the nominal $+H_B$ hard axis bias field condition of FIG. 2d, $a+H_S$ easy axis signal field is inductively coupled to element 40, see FIG. 2b, the magnetization 50 thereof is rotated away from the hard axis 44 toward the easy axis 42 forming a smaller acute angle $\alpha$ with current conducting means 46. This decrease in the angle between the magnetization of element 40 and current conducting means 46 increases the resistance of element 40 to the flow of current therethrough.

If now, from the nominal $+H_B$ hard axis bias field condition of FIG. 2d, $a-H_S$ easy axis signal field is inductively coupled to element 40, see FIG. 2c, the magnetization 52 thereof is rotated away from hard axis 44 toward the easy axis 42 forming a larger acute angle $\beta$ with current conducting means 46. This increase in the angle between the magnetization of element 40 and current conducting means 46 decreases the resistance of element 40 to the flow of current therethrough.

With particular reference to FIG. 2d, there is presented a diagrammatic illustration of the effect of the hard axis bias field $-H_B$ upon the magnetization of the magnetoresistive element 40. The diagrammatic illustration of FIG. 2d is substantially similar to that of FIG. 2a except for the opposite polarity of the hard axis bias field $H_B$. In the diagrammatic illustration of FIG. 2d, the coupling of the hard axis bias field $-H_B$ causes the magnetization of element 40 to be aligned in a downward direction, in contrast to the upward direction of FIG. 2a, causing the magnetization 54 to be aligned with the hard axis 44 forming the angle $\phi'$ between it and the current conducting means 46. This angle $\phi'$ of FIG. 2d is similar to the angle $\phi$ of FIG. 2a; the magnetization vectors being of opposite polarization along the hard axis 44. This may be considered to be the nominal $-H_B$ hard axis bias field condition in contrast to the nominal $+H_B$ hard axis bias field condition of FIG. 2a.

Figure 2E:
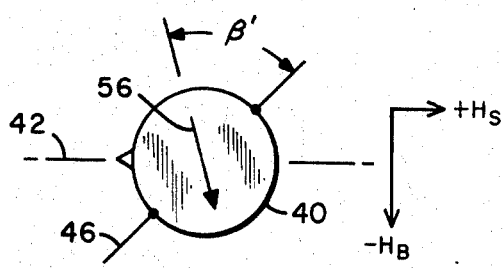

If now, from the nominal $-H_B$ hard axis bias field condition of FIG. 2d, $a+H_S$ easy axis signal field is inductively coupled to element 40, see FIG. 2e, the magnetization 56 thereof is rotated away from the hard axis 44 toward the easy axis 42 forming a larger acute angle $\beta'$ with current conducting means 46. This increase in the angle between the magnetization of element 40 and current conducting means 46 decreases the resistance of element 40 to the flow of current therethrough.

Figure 2F:
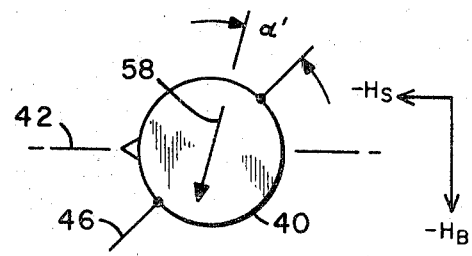

If now, from the nominal $-H_B$ hard axis bias field condition of FIG. 2d, $a-H_S$ easy axis signal field is inductively coupled to element 40, see FIG. 2f, the magnetization 58 thereof is rotated away from the hard axis 44 toward the easy axis 42 forming a smaller acute angle $\alpha'$ with current conducting means 46. This decrease in the angle between the magnetization of element 40 and current conducting means 46 increases the resistance of element 40 to the flow of current therethrough.

Figure 3:
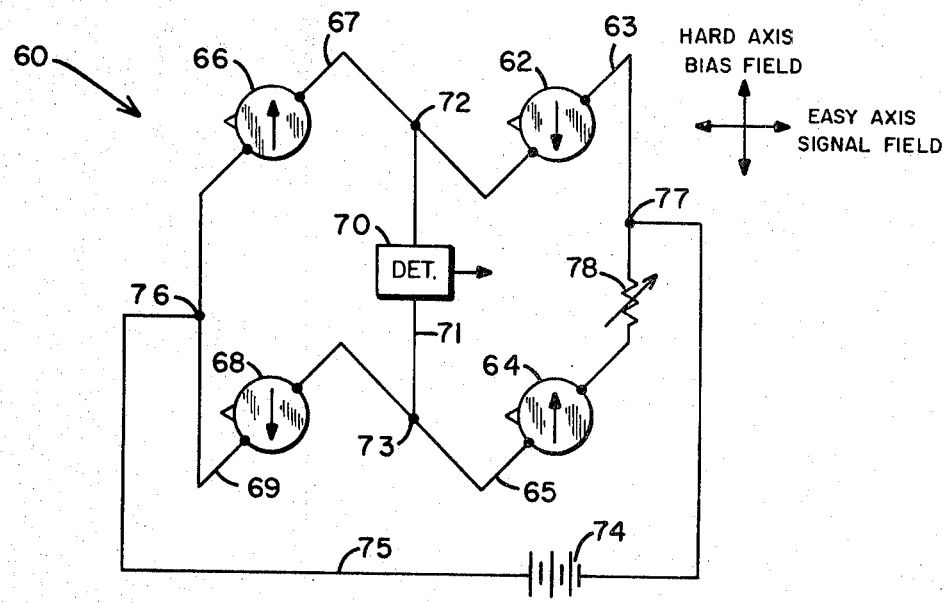
FIG. 3 is an illustration of a preferred embodiment of the present invention.

With particular reference to FIG 3 there is presented an illustration of a preferred embodiment of the present invention. FIG. 3 is an illustration of a magnetometer system 60 utilizing four anisotropic thin-ferromagnetic-film elements 62, 64, 66, 68 arranged in a Wheatstone bridge configuration by their associated current conducting means 63, 65, 67, 69. Each of said current conducting means 63, 65, 67, 69 is coupled to its associated element 62, 64, 66, 68 for causing current to pass therethrough at approximately a 45° angle with respect to its easy axis. Detector 70 is coupled across midpoint nodes 72, 73 by conducting means 71 much in the nature as discussed with respect to magnetometer system 10 of FIG. 1. Additionally, as with magnetometer system 10 of FIG. 1, current source 74 is coupled across nodes 76, 77 by current conducting means 75 for causing current components to pass through the Wheatstone bridge configuration as discussed with particular reference to FIG. 1. As with FIG. 1, balancing means such as resistor 78 may be utilized to balance the Wheatstone bridge configuration under nominal conditions. Magnetometer system 60, as does magnetometer system 10, utilizes four anisotropic thin-ferromagnetic-film elements that are arranged in a Wheatstone bridge configuration with their easy axes aligned and with associated current conducting means coupled to the associated elements for causing current to pass therethrough at approximately a 45° angle with respect to their easy axes. However, whereas in magnetometer system 10 of FIG. 1 the four elements are subjected to like polarity hard axis bias fields $H_B$, the parts of elements in the balancing legs of the Wheatstone bridge of magnetometer system 60 are subjected to hard axis bias fields $H_B$ of opposite polarities whereby the bridge network substantially self-cancels ambient field, i.e., constant hard axis field, components. This arrangement permits a more accurate measurement of the to-be-measured magnetic field to which the four elements of the Wheatstone bridge are subjected.

The magnetoresistive elements utilized in the embodiments of FIGS 1 and 3 are well-known devices having single-domain properties and the characteristic of uniaxial anisotropy with an anisotropic field $H_k$ for providing in the planes of the elements a hard axis and an orthogonal easy axis of magnetization along which the remanent magnetization thereof may lie in a first or a second and opposite direction. These easy and hard axes of magnetization in the plane of the element correspond to minimum and maximum energy conditions, respectively, the theoretical model having the anisotropy energy relationship equation, $$E = K_1 \sin^2 \theta$$

where $K_1$ is the anisotropic field constant characteristic of the element and $\theta$ is the acute angle the magnetization vector makes with the easy axis of the element. The practical element behavior agrees quite closely with that predicted by this theoretical model when the element is subjected to a hard axis field comparable to $H_k$, the anisotropy field, where $H_k$ is defined as the hard axis field that is necessary to rotate the magnetization of the element from along its easy axis into alignment with its hard axis. The practical element differs from the theoretical model in that the anisotropy field constant $H_k$ across the element area is not homogeneous in direction or amplitude, but is dispersed about the mean easy axis. Measurements of the variations from the theoretical model are designated as the angular distribution of the easy axis about the average easy axis and the amplitude variation of $H_k$ about the average $H_k$ value. The anisotropy field variations are denoted by the symbol $\Delta_{90}$ while the easy axis distributions are quantitatively denoted by the symbol $\alpha_{90}$.

In the preferred embodiment of FIG. 3 the elements are operated in or near the maximum permeability mode; the maximum permeability mode for an easy axis signal field occurs when the magnetization vector is rotated out of alignment from the easy axis into alignment with the hard axis by a hard axis field the intensity of which is equal to the anisotropy field $H_k$. Due largely to angular dispersion $\alpha_{90}$ and amplitude distribution $\Delta_{90}$, in the practical element, the permeability is not infinite as predicted by the theoretical model; it reaches a broad maximum at a hard axis field value and thereafter decreases slowly and almost linearly at hard axis intensities greater than anisotropy field $H_k$. In the embodiment of FIG. 3 the hard axis field may be applied by energizing a modified solenoid or stripline or by a suitably positioned permanent magnet.

As is well-known, the magnetoresistance effect in magnetoresistive thin-ferromagnetic-film elements having single domain properties and the characteristic of uniaxial anisotropy may be described by the equation $$R = (R_{max} - R_{min}) \cos^2 \theta + R_{min}$$

where:

R is the element resistance, $(R_{max} - R_{min})$ is a maximum change in resistance of the element as the magnetization vector is rotated from an orientation orthogonal to the direction of the sensing current through the element to an orientation aligned with the sensing current direction. In 81% Ni-91% Fe thin-ferromagnetic-film elements it is typically 2-3% of the nominal element resistance, and $\theta$ is the acute angle that the magnetization vector makes with the sense current direction.

In plotting R as a function of $\theta$, a maximum change in R, or $\Delta R$, with $\theta$ occurs at $\theta = 45°$. This point is also the center of a sizeable region over which R changes linearly with $\theta$. Any sensitive sensing of the magnetization vector is preferably done under this optimal condition. In the practical magnetometer system of FIG. 3, the current sensing electrodes, current conducting means 63, 65, 67, 69, are coupled to the associated elements 62, 64, 66, 68 for causing the current to pass through such elements at approximately a 45° angle with respect to the nominal magnetization vector orientation along the element's hard axis. The change in resistance of the element upon application of an easy axis signal field will result in a measured and proportionate change in voltage $\Delta E$ across the element, having a value of $I\Delta R$; where I is the current passing through the element and is determined by the voltage applied across the element and by the element resistance and any series resistances. In this simple magnetometer system, $\Delta E$ is proportional to the easy axis component of the magnetic field that is to be measured, and, as such, is a measurement of this field. In this respect, $\Delta E$ and the associated change in energy, may be very large for a very small change in position and energy of the magnetization vector whereby signal amplification is inherent in the magnetoresistive sensing process utilized by the present invention—see Pat. No. 3,382,448.

Figure 4:
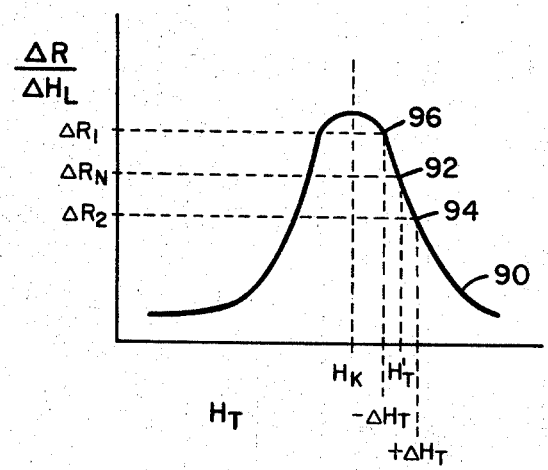
FIG. 4 is an illustration of a graph of the sensitivity curve of the elements of FIGS. 1 and 3.

With particular reference to FIG. 4 there is presented an illustration of a graph of the sensitivity curve of the elements of FIGS. 1, 2 and 3. With respect to the embodiment of FIG. 3 there is presented a magnetometer system which is substantially insensitive to hard axis field components, and, correspondingly, substantially more sensitive to the detection of to-be-measured magnetic fields of substantially less intensity than that permitted by the magnetometer system of FIG. 1. As previously discussed with particular referece to FIGS. 2a–2f, upon the application of a magnetic field to the magnetoresistive element the element's magnetization vector is caused to assume a new orientation with respect to its previous hard axis position whereby the element's resistance to current flow therethrough changes. FIG. 4 is a plot of the sensitivity curve 90 characteristic of the elements of FIGS. 1, 2 and 3. Curve 90 is obtained by plotting the change in resistance $\Delta R$ with respect to a change in the easy axis field $\Delta H_L$ for a given hard axis field $H_T$.

Considering curve 90, assume that an element, e.g., 40 of FIGS. 2a–2f, is subjected to the earth's, or any other constant (DC), ambient field which ambient field tends to cause rotational deflection of the magnetization of the effected element from its nominal hard axis position that is established by a hard axis bias field $H_T$. From a nominal element 40 sensitivity of point 92 the change in sensitivity $\Delta R/\Delta H_L$ along curve 90 that is due to a change in the easy axis field $H_T$ of $+\Delta H_T$ and of $-\Delta H_T$ provides corresponding changes along the sensitivity curve 90 as at points 94 and 96. In the arrangement of FIG. 1 the effects of the sensitivity changes of the individual elements 12, 16 as compared to the effects of the sensitivity changes of the individual elements 18, 14 are not self-cancelling in the bridge configuration whereby the bridge configuration of FIG. 1 is not caused to be less sensitive to ambient hard axis field components. However, in FIG. 3 due to the hard axis bias field first and second and opposite polarities with respect to the elements' 62, 66 and 64, 68 current directions and easy axis orientations a self-cancelling of sensitivity variations is achieved. As an example, in FIG. 3 a hard axis field rotates the magnetization of elements 64, 66 in a like manner and rotates the magnetization of elements 62, 68 in a like manner, but in an opposite manner to that of elements 64, 66. Thus, elements 64, 66 may be considered to operate at point 96 while elements 62, 68 may be considered to operate at point 94 providing an average operating sensitivity of point 92 for the bridge configuration of FIG. 3. The effect on the configuration of FIG. 3 is to utilize the individual element's variations in sensitivity to hard axis field components to achieve a self-cancelling, or averaging, effect upon the four individual elements of FIG. 3.

Figure 5:
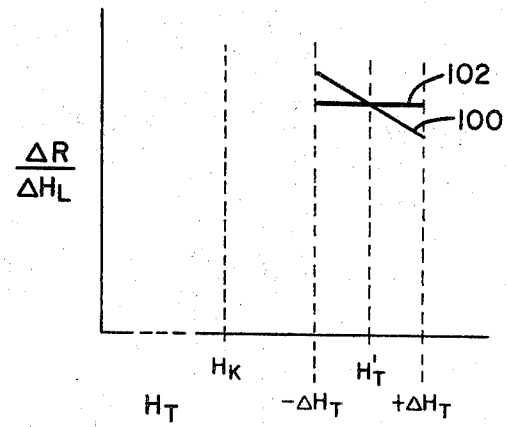
FIG. 5 is an illustration of the graphs of the sensitivities of the bridge configurations of FIGS. 1 and 3.

This averaging effect is illustrated in FIG. 5 wherein there are presented illustrations of the graphs of the sensitivities of the bridge configurations of FIGS. 1 and 3. Curve 100 is a plot of the sensitivity of the bridge configuration of FIG. 1 to changes in hard axis drive field components in the range $+\Delta H_T$ to $-\Delta H_T$ as illustrated in FIG. 4. In contrast, curve 102 is a plot of the sensitivity of the bridge configuration of FIG. 3 to changes in hard axis drive field components in the range of $+\Delta H_T$ to $-\Delta H_T$ as illustrated in FIG. 4. These curves 100, 102 graphically illustrate the self-cancelling, or averaging effect achieved by applicants' invention as illustrated in FIG. 3. Applicants', by providing a magnetometer system that is substantially insensitive to hard axis field components of constant ambient fields have povided an arrangement that is more sensitive to easy axis field components of to-be-measured magnetic fields. Accordingly, it is apparent that applicants have illustrated and described herein a novel magnetometer system.

Figure 6:
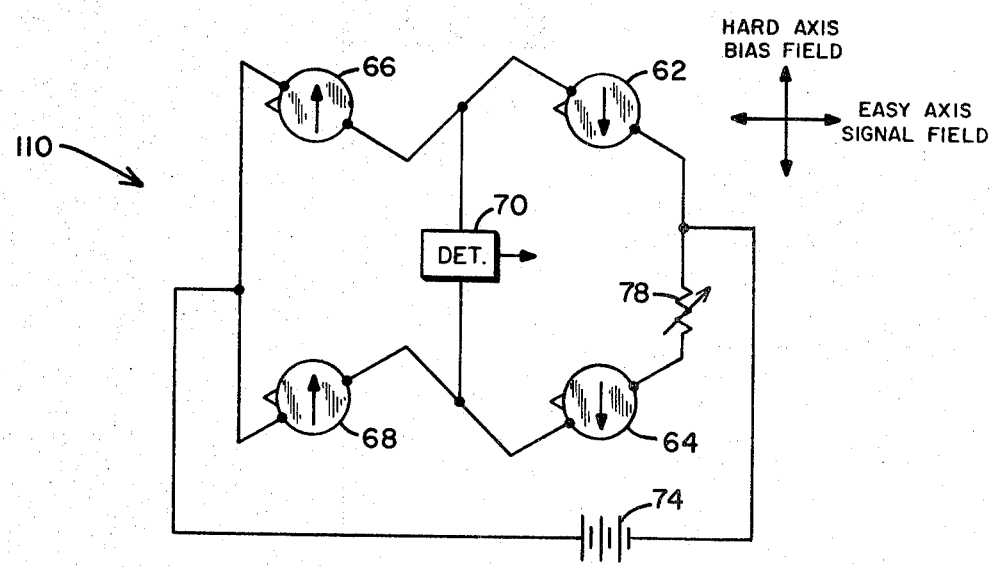
FIG. 6 is an illustration of a second embodiment of the present invention.

With particular reference to FIG. 6 there is presented an illustration of a second embodiment of the present invention. Magnetometer system 110 of FIG. 6 is similar to magnetometer system 60 of FIG. 3 except for the polarity orientations of the hard axis bias fields and of the angular orientations of the easy axes and the associated current conducting means. Both systems operate in similar manners whereby there is generated a substantially self-cancelling of hard axis ambient field components.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

We claim:
1. A magnetoresistive magnetometer sensitive to easy axis field components of a field to be measured, yet insensitive to hard axis field components of a constant ambient field, comprising:
   four planar magnetoresistive elements having orthogonal easy and hard axes in the plane of said elements;
   said elements arranged in a Wheatstone bridge configuration by associated current conductor means;
   each of said current conductor means coupled to the associated element for causing current to pass therethrough in given directions;
   detector means coupled across first pairs of said elements for detecting unbalanced current components in said Wheatstone bridge due to the field to be measured;
   current source means coupled across other second pairs of said elements for causing balanced current components to pass through said current conductor means and the associated elements in said given directions;
   bias means inductively coupled to said elements for coupling to said elements bias fields that are similarly oriented in the planes of said elements and orthogonal to said easy axes;
   said bias fields having, in the areas of the elements of each of said first pairs, opposite polarities;
   said bias fields having, in the areas of the elements of each of said second pairs, opposite polarities;
   said opposite polarity bias fields causing hard axis components of said ambient field to produce equal but opposite effects upon said elements for generating substantially self-cancelling balancing current components in said Wheatstone bridge.

2. The magnetometer of claim 1 wherein said elements are thin-ferromagnetic-films having single domain properties and uniaxial anisotropy with an anisotropic field $H_k$ for providing in the planes of said elements said hard axis and said orthogonal easy axis of magnetization along which the remanent magnetization thereof may lie in a first or second and opposite direction.

3. The magnetometer of claim 2 wherein the given current direction of each element is at approximately a 45° angle with respect to the element's easy axis.

4. The magnetometer of claim 3 wherein said bias fields have intensities in the areas of said elements that are at least as great as the anisotropy field $H_k$ of the respective element.

5. The magnetometer of claim 4 wherein said two first pairs of elements are coupled in parallel across said detector means.

6. The magnetometer of claim 5 wherein said two second pairs of elements are coupled in parallel across said current source means.

7. The magnetometer of claim 6 wherein like first polarity bias fields couple one element of each of said first pairs of elements.

8. The magnetometer of claim 7 wherein like second polarity bias fields couple the other element of each of said first pairs of elements.

9. The magnetometer of claim 6 wherein one element of one pair of said first pairs of elements and the other element of the other pair of said first pairs of elements form one pair of said second pairs of elements.

10. A thin-ferromagnetic-film magnetoresistive magnetometer sensitive to easy axis field components of a field to be measured, yet insensitive to hard axis field components of a constant ambient field, comprising:
   four magnetoresistive thin-ferromagnetic-film elements having single domain properties and the characteristic of uniaxial anisotropy with an anisotropic field $H_k$ for providing in the planes of said elements a hard axis and an orthogonal easy axis of magnetization along which the remanent magnetization thereof may lie in a first or a second and opposite direction;
   said elements arranged in a Wheatstone bridge configuration by associated current conductor means;
   each of said current conductor means coupled to the associated element for causing current to pass therethrough at approximately a 45° angle with respect to its easy axis;
   detector means coupled across first pairs of said elements for detecting current unbalancing components in said Wheatstone bridge due to the field to be measured;
   current source means coupled across other second pairs of said elements for causing current components to pass through said current conductor means and the associated elements;
   bis means inductively coupled to said elements for coupling to and in the planes of said elements bias fields that are orthogonally oriented to the easy axes of said elements and which fields have intensities in the areas of said elements that are at least as great as the anisotropy fields $H_k$ of said elements;
   said bias fields having, in the areas of said elements of said first pair, opposite polarities;
   said bias fields having, in the areas of said elements of said second pair, opposite polarities;
   said opposite polarity bias fields causing said ambient hard axis field components to produce equal but opposite effects upon said elements for generating substantially self-cancelling balancing current components in said Wheatstone bridge.

References Cited
UNITED STATES PATENTS 3,405,355  10/1968  Hebbert _____ 324—46

FOREIGN PATENTS 1,020,107  11/1957  Germany _____ 324—46

OTHER REFERENCES

Hebbert et al.: Thin Flim Magnetoresistance Magnetometer; The Review of Scientific Instruments; vol. 37; No. 10, October 1966, pp. 1321–1323.

RUDOLPH V. ROLINEC, Primary Examiner

R. J. CORCORAN, Assistant Examiner